F. MILLIKEN.
TOWER OR POLE.
APPLICATION FILED FEB. 29, 1908.
923,557.
Patented June 1, 1909.
2 SHEETS—SHEET 1.
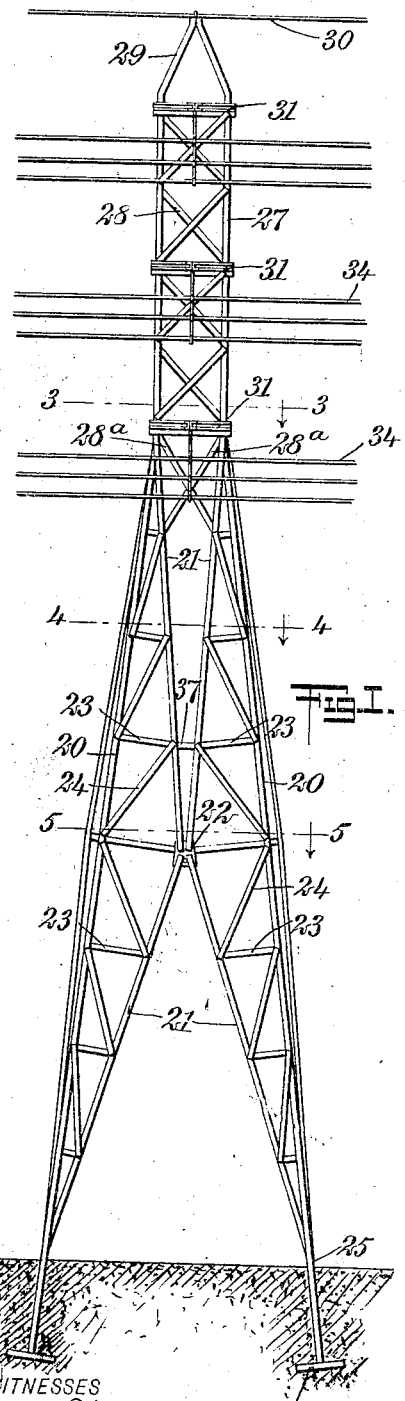
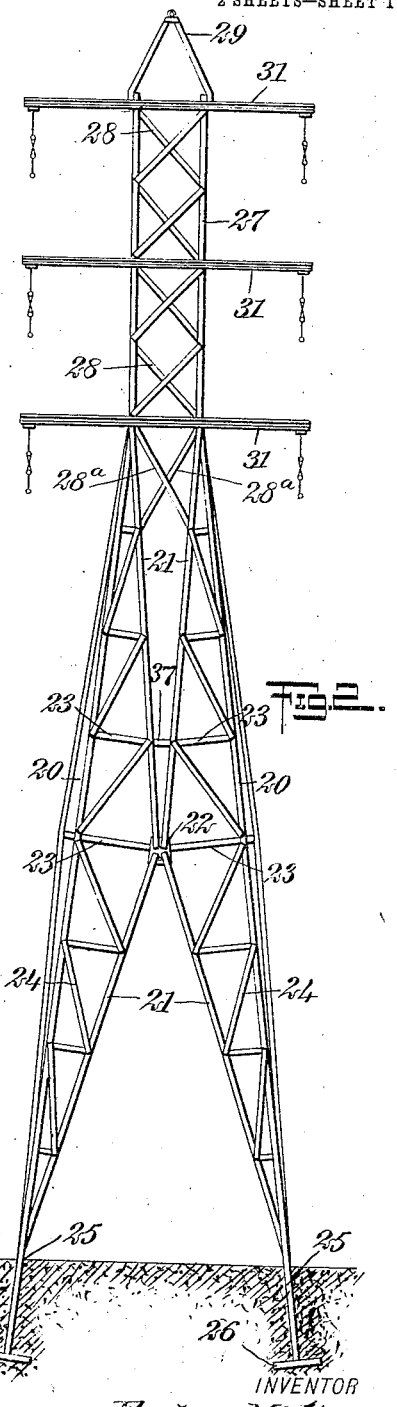

F. MILLIKEN.
TOWER OR POLE.
APPLICATION FILED FEB. 29, 1908.
923,557.
Patented June 1, 1909.
2 SHEETS—SHEET 2.
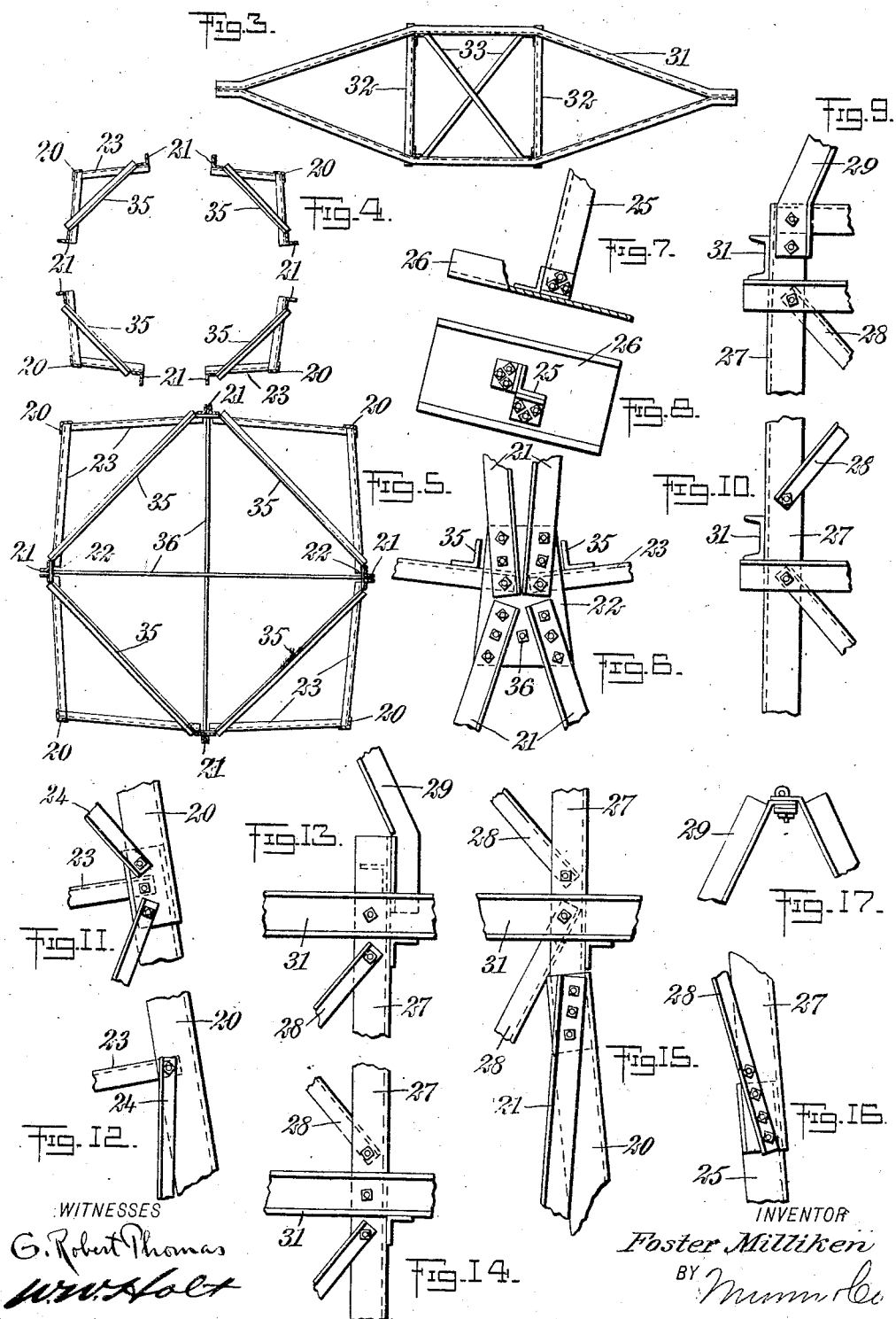
WITNESSES
G. Robert Thomas
W. W. Holt
INVENTOR
Foster Milliken
BY
Munn & Co.
ATTORNEYS

UNITED STATES PATENT OFFICE.

FOSTER MILLIKEN, OF NEW YORK, N. Y.

TOWER OR POLE.

No. 923,557.

Specification of Letters Patent.

Patented June 1, 1909.

Application filed February 29, 1908. Serial No. 418,429.

*To all whom it may concern:*

Be it known that I, FOSTER MILLIKEN, a citizen of the United States, and a resident of the city of New York, borough of Manhattan, in the county and State of New York, have invented a new and Improved Tower or Pole, of which the following is a full, clear, and exact description.

This invention is an improvement in structural steel poles or towers, for electric transmission cables as are designed to conduct electricity from the place of generation to distant points. The poles for this purpose are generally placed a considerable distance apart in order to economize in construction as much as is feasible, and accordingly each pole is subjected to severe strains of varying natures; such strains, for example, as those due to the dead load of the wires, cables, or other form of conductors which exert a downward force; the wind which, is in a direction crosswise of the wires, tends to overturn the pole, and, if in substantial alinement therewith, causes the wires to weave, *i. e.*, move up and down in the form of waves, tending to rack the pole; and by the stringing of the wires, which is performed by stretching one wire at a time, subjecting the pole to twisting or torsional strain, tending to cork-screw it.

I have produced a structural steel pole, principally composed of relatively light angle-iron, which has been found in practice to effectually resist the several strains above enumerated, and it consists generally of a pyramidal pedestal portion, and a tower having approximately, parallel opposite faces rising from the pedestal portion, and provided with cross arms at intervals of its length for carrying the transmission cables. The side faces of the pedestal portion of the pole are each composed of two trusses having their tie-beams arranged at the corners of the pedestal and rigidly connected at the junction of their truss-beams, and with each side face presenting a slightly bulging form. The tower is composed of corner posts rigidly connected together by lattice braces, and in addition to carrying the truss-arms for the transmission cable, is provided with a pyramidal peak, serving to connect the several poles together by an auxiliary cable.

Reference is to be had to the accompanying drawings forming a part of this specification, in which similar characters of reference indicate corresponding parts in all the views.

Figure 1 is a side elevation of a pole or tower embodying my invention; Fig. 2 is also a side elevation, looking at the pole in a direction at right-angles to that of Fig. 1; Fig. 3 is a cross-section of the pole on the line 3—3 of Fig. 1, showing one of the cross-arms in plan; Fig. 4 is a cross-section of the pole on the line 4—4 of Fig. 1; Fig. 5 is a cross-section of the pole on the line 5—5 of Fig. 1; Fig. 6 is a fragmentary view on an enlarged scale, of the connection between two of the trusses which form one side face of the pyramidal pedestal; Fig. 7 is a view partly in section, showing the connection of one of the stubs or legs of the pole and its anchoring plate; Fig. 8 is a plan of the construction shown in Fig. 7; Fig. 9 illustrates in side elevation the connection between the tower of the pole and its peak; Fig. 10 is a corresponding fragmentary view of the tower at the middle cross-arm; Fig. 11 is a view at the center of one of the corner posts or tie-beams of the pyramidal pedestal; Fig. 12 is a similar view of one of the tie-beams at a point lower down; Fig. 13 is a view of the construction shown in Fig. 9, looking in a direction crosswise of the cross-arms; Fig. 14 is a view of the construction shown in Fig. 10, looking in a direction at right-angles to the cross-arm; Fig. 15 is a view illustrating one of the connections at the corner of the pole between the pyramidal pedestal and the tower; Fig. 16 is a view showing the connection between one of the trusses and its supporting leg or stub; and Fig. 17 is a fragmentary view of the tower peak.

The pole or tower proper is made up of a pyramidal lower portion and an upper portion of uniform construction, which, for the purpose of convenience of description I respectively term the pedestal and the tower. Each side face of the pedestal is composed of two trusses consisting of tie-beams 20, forming the corners of the pedestal, and truss-beams 21 which are joined together by a plate 22, as best shown in the detail view, Fig. 6. The trusses are reinforced by queen posts 23, substantially equally spaced, and by diagonal braces 24, connecting the tie-beams and truss-beams at the points of intersection with the posts. This construction reduces the unsupported length of the corner angle which is in compression, thus getting from this angle its full strength. Each of the tie-beams is extended below its respective truss to provide legs or stubs 25, and the tie-beams are provided at their lower extremities with feet 26, in the nature of channel bars, which operate to anchor the stubs or legs of the pole in the ground.

The tower of the pole has approximately parallel opposite faces and is made up of corner posts 27, rigidly connected together by lattice braces 28, with the lower of said braces 28ª extending to and connected with the truss-beams of the adjacent set of trusses, as clearly shown in Figs. 1 and 2. The braces 28ª relieve the upper truss beams of part of their compression when the pole is under a torsional strain. The connection between the pedestal and the tower is best illustrated in Fig. 15, and the top of the latter is provided with a pyramidal peak 29, having means at its vertex for the attachment of an auxiliary cable 30, and is further provided with a number of cross-arms 31 arranged at suitable intervals of its length, in the present case three of such arms being shown, which are respectively placed at the bottom, at the top, and at an intermediate portion of the tower. These cross-arms, as best shown in Fig. 3, are of truss construction, of expanded width at the center to closely fit around the tower, and have struts 32 to abut against the opposite sides of the tower, and diagonal brace-bars 33 arranged between these struts. This manner of bracing serves to provide a construction capable of effectually resisting torsional strains, as when the wires are strung. At the outer end of each cross-arm suitable hangers are provided for suspending the transmission cables or wires 34.

As will be seen from Figs. 4 and 5, the adjacent trusses of opposite sides of the pyramidal pedestal are rigidly connected together by braces 35, extending across the corners, and at the points where the truss-beams of the trusses are connected together, cross-bolts or rods 36 extend through the plates 22 and operate to hold the pedestal in shape. It will also be seen from these views that the trusses of each face of the pedestal do not lie in the same plane, but in planes which make with each other an angle slightly less than one hundred and eighty degrees at the inside of the pole, thus giving to the faces of the pedestal a bulging form. This arrangement of the trusses places them in a plane more in opposition to a torsional or twisting strain. When such a strain is placed on the pole the upper truss-beams are in compression, and I have found that a portion of this strain on these beams could be transmitted to the tie-beams by extending the queen posts 23 directly above the plates 22, entirely across each face of the pedestal as one piece, as indicated at 37 in Figs. 1 and 2.

It will be seen from the several enlarged detail views that the parts of the pole are bolted together, which permits of the pole being disassembled and packed in a small space for shipment to the point of erection. Also, the construction of the pole involves the duplication of many parts, which is obviously a desirable feature in its manufacture, shipment and assembling. In order that the tie-beams may not be too long for shipment I make each of them of two pieces bolted together, as shown in Fig. 11, and also make the legs or stubs 25 of the pole separable and bolt the same to the tie-beams, as shown in Fig. 16.

Having thus described my invention, I claim as new and desire to secure by Letters Patent:

1. A pole having a pyramidal pedestal portion, each side face of which is constructed of two trusses having their tie-beams arranged at the corners of the pedestal and rigidly connected at the junction of their truss-beams, and with the trusses of each side face lying in planes which make an angle with each other slightly less than one hundred and eighty degrees at the inside of the pole.

2. A pole of structural iron having side faces, with each side face lying in a plurality of planes which intersect at a point arranged intermediate the length and width of the side face.

3. A pole having a pyramidal pedestal portion, each side face of which is constructed of two trusses having their tie-beams arranged at the corners of the pedestal and rigidly connected at the junction of their truss-beams, and with each side face having a slightly bulging form.

4. A pole having a pyramidal pedestal portion, each side face of which is constructed of two trusses having their tie-beams arranged at the corners of the pedestal and rigidly connected at the junction of their truss-beams, said trusses each having queen posts and diagonal braces, and a tower carried on the pedestal comprising corner posts rigidly connected together with lattice braces.

5. A structural steel pole having a pyramidal pedestal portion, a tower portion carried by the pedestal portion, of approximately uniform cross sectional area, and cross-arms arranged at intervals of the tower portion of the pole, of expanded width at the center and having diagonal braces reinforcing the tower.

6. A structural steel pole having a pyramidal pedestal portion, each face of which is constructed of two trusses having their tie-beams arranged at the corners of the pedestal and rigidly connected at the junction of their truss beams, and braces extending between the connections of the truss beams which lie in adjacent faces of the pedestal.

7. A structural steel pole having a pyramidal pedestal portion, each face of which is constructed of two trusses having their tie-beams arranged at the corners of the pedestal and rigidly connected at the junction of their truss-beams, braces arranged across the corners between adjacent trusses lying in different faces of the pedestal, and cross-rods extending through the pedestal joining together the connected portions of the truss beams in opposite faces of the pedestal.

8. A structural steel pole having a pedestal portion the side faces of which are constructed of trusses, and a tower portion rising from the pedestal portion, the side faces of which are provided with lattice braces with the lower of said braces connected to and reinforcing the upper truss-beams of the trusses.

9. A pole of structural iron having corner posts rigidly connected together, forming side faces, with each side face lying in a plurality of planes forming in connection with the plane passing through the corner posts, a peaked figure.

10. A pole having a pyramidal portion, each side face of which is constructed of two trusses having their tie beams arranged at the corners and connected at the junction of their truss beams, and with the lower truss beams of each side face, making an angle with each other different from the angle made by the upper truss beams.

11. A pole having a pyramidal portion, each side face of which is constructed of two trusses having their tie beams arranged at the corners and connected at the junction of their truss beams, and with the lower truss beam of one of the trusses in one side face of the pole lying at an angle to the upper truss beam of the other truss lying in the same side face of the pole.

In testimony whereof I have signed my name to this specification in the presence of two subscribing witnesses.

FOSTER MILLIKEN.

Witnesses:
T. D. GRIFFITH,
ANNA L. HOERMANN.